(12) United States Patent
Focke et al.

(10) Patent No.: US 8,344,939 B2
(45) Date of Patent: Jan. 1, 2013

(54) RADAR SENSOR FOR MOTOR VEHICLES

(75) Inventors: Thomas Focke, Ahrbergen (DE); Joerg Hilsebecher, Hildesheim (DE); Thomas Binzer, Stuttgart (DE); Thomas Schoeberl, Hildesheim (DE); Thomas Hansen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 12/733,008

(22) PCT Filed: Jun. 23, 2008

(86) PCT No.: PCT/EP2008/057971
§ 371 (c)(1),
(2), (4) Date: Apr. 26, 2010

(87) PCT Pub. No.: WO2009/015945
PCT Pub. Date: Feb. 5, 2009

(65) Prior Publication Data
US 2010/0231436 A1    Sep. 16, 2010

(30) Foreign Application Priority Data
Aug. 2, 2007   (DE) .................. 10 2007 036 262

(51) Int. Cl.
*G01S 13/00*    (2006.01)
*H01Q 19/06*    (2006.01)
*H01Q 15/02*    (2006.01)

(52) U.S. Cl. .......... 342/70; 342/153; 342/154; 343/753; 343/754; 343/909

(58) Field of Classification Search .............. 342/70–72, 342/153, 154, 175; 343/753, 754, 909
See application file for complete search history.

(56) References Cited

U.S. PATENT DOCUMENTS

| | | | | |
|---|---|---|---|---|
| 4,769,646 A * | 9/1988 | Raber et al. | .................... | 343/753 |
| 4,975,712 A * | 12/1990 | Chen | ............................. | 343/754 |
| 5,206,658 A * | 4/1993 | Wokurka | ....................... | 343/755 |
| 5,276,452 A * | 1/1994 | Schuss et al. | ................. | 342/371 |
| 5,559,322 A * | 9/1996 | Jacoby et al. | ............... | 250/203.1 |
| 5,948,172 A * | 9/1999 | Neiheisel | ........................... | 134/1 |
| 5,949,365 A * | 9/1999 | Wagner | ............................ | 342/70 |
| 5,968,383 A * | 10/1999 | Yamazaki et al. | ....... | 219/121.75 |
| 5,991,474 A * | 11/1999 | Baldi | ............................... | 385/15 |
| 6,031,483 A * | 2/2000 | Urabe et al. | ..................... | 342/70 |
| 6,043,772 A * | 3/2000 | Voigtlaender et al. | .......... | 342/70 |
| 6,107,955 A * | 8/2000 | Wagner | ............................ | 342/70 |
| 6,137,434 A * | 10/2000 | Tohya et al. | .................... | 342/70 |
| 6,147,656 A * | 11/2000 | Luh | ................................ | 343/753 |
| 6,204,755 B1* | 3/2001 | Kikuchi | ........................ | 340/435 |
| 6,275,180 B1* | 8/2001 | Dean et al. | ..................... | 342/70 |
| 6,590,544 B1* | 7/2003 | Filipovic | ....................... | 343/753 |

(Continued)

FOREIGN PATENT DOCUMENTS
DE    10 2004 053419    5/2006
(Continued)

*Primary Examiner* — Jack W Keith
*Assistant Examiner* — Peter Bythrow
(74) *Attorney, Agent, or Firm* — Kenyon & Kenyon LLP

(57) ABSTRACT

Radar sensor for motor vehicles, having a transmitting and receiving device for microwaves, in which beam-shaping devices which are independent of one another are provided for the azimuth and the elevation, and the beam-shaping device for the elevation has a cylindrical lens.

10 Claims, 4 Drawing Sheets

U.S. PATENT DOCUMENTS

| | | | | |
|---|---|---|---|---|
| 7,145,505 | B2* | 12/2006 | Gottwald et al. | 342/175 |
| 7,310,061 | B2* | 12/2007 | Nagasaku et al. | 342/104 |
| 7,358,913 | B2* | 4/2008 | Ebling et al. | 343/753 |
| 7,421,212 | B2* | 9/2008 | Allen | 398/202 |
| 7,432,846 | B2* | 10/2008 | Martin et al. | 342/22 |
| 7,532,153 | B2* | 5/2009 | Nagasaku et al. | 342/104 |
| 7,764,221 | B2* | 7/2010 | Voigtlaender et al. | 342/70 |
| 7,786,928 | B2* | 8/2010 | Hansen et al. | 342/175 |
| 7,800,549 | B2* | 9/2010 | Rebeiz et al. | 343/754 |
| 7,948,428 | B2* | 5/2011 | Lovberg et al. | 342/22 |
| 7,961,140 | B2* | 6/2011 | Binzer | 342/175 |
| 2002/0093881 | A1* | 7/2002 | Kane | 367/149 |
| 2003/0132205 | A1* | 7/2003 | Yamazaki et al. | 219/121.66 |
| 2008/0278393 | A1* | 11/2008 | Gottwald et al. | 343/753 |
| 2008/0297400 | A1* | 12/2008 | Hansen et al. | 342/70 |
| 2009/0213019 | A1* | 8/2009 | Schoebel | 343/711 |
| 2010/0231436 | A1* | 9/2010 | Focke et al. | 342/70 |
| 2010/0271278 | A1* | 10/2010 | Binzer et al. | 343/824 |

FOREIGN PATENT DOCUMENTS

| | | |
|---|---|---|
| DE | 10 2005 033414 | 1/2007 |
| JP | 60 257511 | 12/1985 |
| WO | 2006/029926 | 3/2006 |

* cited by examiner

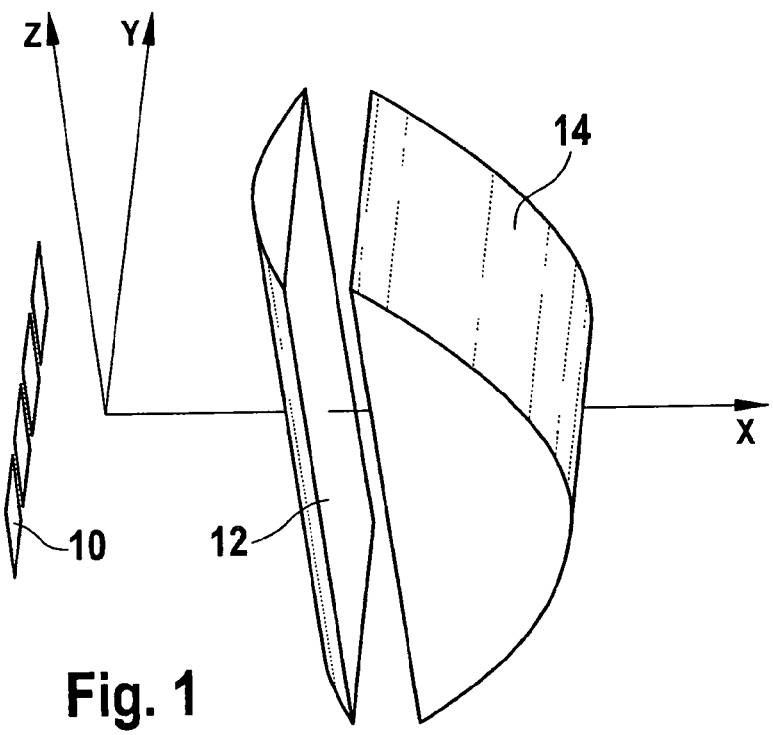
Fig. 1
Fig. 2
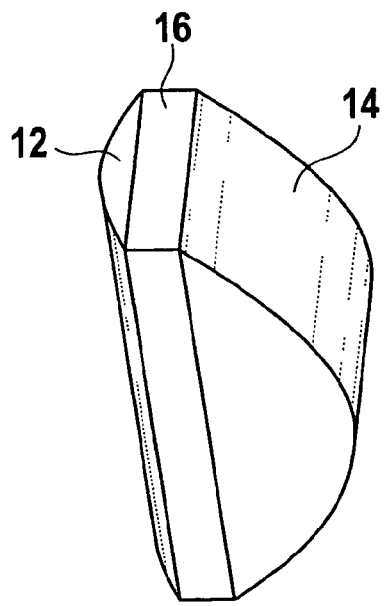
Fig. 3
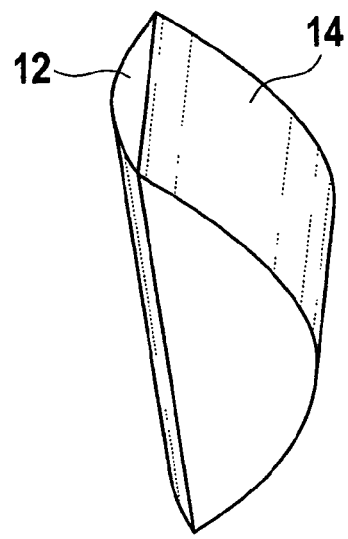

RADAR SENSOR FOR MOTOR VEHICLES

FIELD OF THE INVENTION

The present invention relates to a radar sensor for motor vehicles, having a transmitting and receiving device for microwaves and a beam-shaping device which determines the directional characteristic of the transmitted and/or received microwave radiation in the azimuth and in the elevation.

BACKGROUND INFORMATION

In motor vehicles, radar sensors are used in conjunction with driver assistance systems, for example, distance warning and control systems, and for position finding of objects, in particular other vehicles, in the surroundings of the host vehicle. For example, long-range radar (LRR) sensors which operate at a frequency of approximately 77 GHz as well as short-range radar (SRR) sensors which operate at a frequency of 24 GHz are common. When the radar sensor is installed in the front of the vehicle and is used to measure the distance from preceding vehicles, the purpose of the beam-shaping device is to bundle the emitted and/or received radar radiation, at least for a forwardly directed radar lobe, in such a-way that the maximum intensity and sensitivity are achieved in the angular range in which preceding vehicles are normally present, whereas objects located farther from the roadway produce little or no radar echo. For a radar sensor which operates by angular resolution, multiple radar lobes are generated which fan out in the azimuth, thus allowing conclusions to be drawn concerning the azimuth angle of the located object based on the amplitude and phase relationships between the signals received from the various lobes.

In one common design of radar sensors for motor vehicles, the beam-shaping device is formed by a spherical lens or, in a more general sense, a lens in the shape of a rotational solid which is made of a plastic which has a high index of refraction for the particular frequency of the radar radiation and which bundles the radiation in the manner of a focusing lens. Thus, essentially the same directional characteristic is achieved in the azimuth (in the horizontal direction) and in the elevation (in the vertical direction). For radar sensors, which operate by angular resolution and which have multiple adjacent antenna elements situated in the focal plane of the lens, interference between these antenna elements may result in a certain modification of the directional characteristic in the azimuth.

However, for long-range radar sensors it is often desirable to bundle the radiation in the elevation more strongly than in the azimuth, so that on the one hand a sufficiently wide field of vision is achieved in the azimuth, but on the other hand, as the result of stronger bundling in the elevation unnecessary energy losses are avoided while at the same time it is possible to better suppress interfering signals resulting from reflection from the roadway surface or the like. One way to achieve such an anisotropic directional characteristic, i.e., one that is different in the elevation compared to the azimuth, is to use complicated lens systems having multiple lenses. However, in radar sensors for motor vehicles this is not feasible for cost reasons and because of the large space requirements for the lens systems.

On the other hand, compact radar sensors having a planar design are known in which the beam is shaped not by use of optical lenses, but, rather, by a suitable selection of the geometry, configuration, and phase angle of multiple antenna elements, for example by use of so-called group antennas, phased arrays, or Rotman lenses (WO 2006/029926). Although the configuration of the antenna elements may be selected in such a way that different directional characteristics are achieved in the azimuth and in the elevation, the numerous antenna elements require a large amount of space on a relatively expensive high-frequency substrate, resulting in relatively high costs for radar sensors of this type, in particular when a high-quality beam-shaping device is to be implemented which allows a symmetrical directional characteristic and good suppression of side lobes.

SUMMARY OF THE INVENTION

An object of the exemplary embodiments and/or exemplary methods of the present invention, therefore, is to provide an economical and compact radar sensor which still allows different directional characteristics in the azimuth and in the elevation.

This object is achieved according to the exemplary embodiments and/or exemplary methods of the present invention by the fact that beam-shaping devices which are independent of one another are provided for the azimuth angle and the elevation, and the beam-shaping device for the elevation has a cylindrical lens.

The independence of the two beam-shaping devices allows the directional characteristic for the elevation, for example, to vary without having appreciable effects on the directional characteristic in the azimuth, thus allowing both directional characteristics to be optimized relatively easily. The use of a cylindrical lens for influencing the directional characteristic in the elevation has the additional advantage that a largely symmetrical beam profile and good suppression of side lobes are achieved. This type of cylindrical lens may be manufactured relatively inexpensively, and may be provided in such a way that the radar sensor as a whole has a relatively compact design.

Advantageous refinements and embodiments of the present invention are also described herein.

In one specific embodiment, the beam-shaping device for the azimuth is also formed by a cylindrical lens whose axis is oriented perpendicular to the axis of the cylindrical lens for the elevation. This ensures that the two beam-shaping devices are independent. The cylindrical lenses may be economically manufactured, optionally as one piece, for example as plano-convex lenses, and may be positioned back-to-back in such a way that in any case the space requirement is not significantly greater than for a conventional radar sensor having a spherical lens.

In another specific embodiment, the beam shaping in the azimuth is achieved not by an optical lens, but instead by an appropriate selection of the geometry, configuration, and/or phase angle of various antenna elements, for example by use of a phased array or a Rotman lens. However, since as the result of this design of the antenna elements it is necessary to bundle only in one direction, namely, in the azimuth, production is much more economical than for an antenna array, which would also have to provide for bundling in the elevation. Additional advantages of using a cylindrical lens for the elevation are that energy losses are minimized due to the more favorable damping characteristics. The cylindrical lens may at the same time be used as a cover or radome for the high-frequency module bearing the antenna elements, thus allowing a compact, relatively flat design of the radar sensor despite the use of an optical lens.

Exemplary embodiments of the present invention are illustrated in the drawings and explained in greater detail in the following description.

BRIEF DESCRIPTION OF THE DRAWINGS

FIG. 1 shows a schematic diagram of a radar sensor according to one specific embodiment of the present invention.

FIG. 2 shows a modified specific embodiment of a lens systems for a radar sensor according to FIG. 1.

FIG. 3 shows a modified specific embodiment of a lens systems for a radar sensor according to FIG. 1.

DETAILED DESCRIPTION

Figure 4:
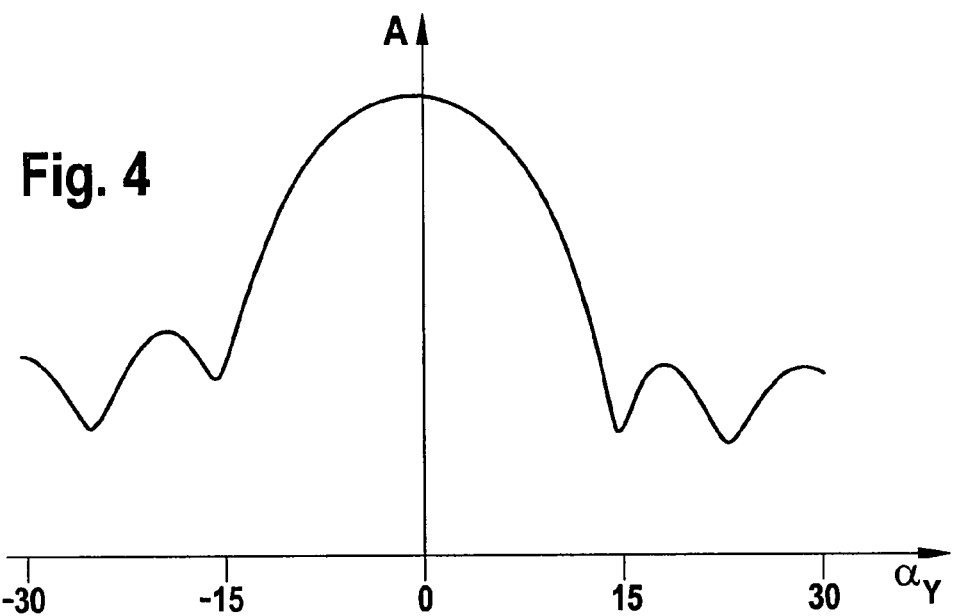
FIG. 4 and FIG. 5 show directional characteristics of the radar sensor according to FIG. 1 in the azimuth and in the elevation.

FIG. 1 illustrates the essential elements of a radar sensor which is to be used, for example, as a long-range distance sensor in a motor vehicle. The radar sensor has four antenna elements 10 which are adjacently situated in a horizontal direction Y transverse to the longitudinal direction of the vehicle. These antenna elements 10 are used both as transmitter antennas and as receiver antennas (monostatic antenna design), and are connected in a known manner to high-frequency circuit elements (not shown) which allow microwave power, for example with a frequency of 77 GHz, to be supplied to each individual antenna element 10, and which allow the radar echo received by this element to be mixed with a portion of the supplied power, thereby injecting an intermediate-frequency signal which indicates the frequency difference between the transmitted signal and the received signal. The distances and relative velocities of the localized objects may then be determined from this intermediate-frequency signal by modulation of the transmitted frequencies according to the principle of Frequency Modulated Continuous Wave (FMCW) radar.

The four antenna elements 10 may be supplied signals which are in-phase and have the same frequency, but optionally may also operate at slightly different frequencies, thereby suppressing the influence of interference effects on the directional characteristic. The directional angle (azimuth angle) of the located objects in the plane defined by the Y axis and the X axis extending in the longitudinal direction of the vehicle may be computed by separately evaluating the signals received from the four antenna elements and comparing the particular amplitudes and phases. The angular resolution capability is a function of the directional characteristic of the transmitted and received radar radiation in the azimuth.

Two planoconvex cylindrical lenses 12, 14 made of plastic having a relatively high index of refraction for the radar radiation are situated at a distance in front of the plane of antenna elements 10. The axis of cylindrical lens 12 is oriented in the Z direction (vertical), and in the example shown is thus used for bundling the radar radiation and therefore for determining the directional characteristic in the azimuth (in the horizontal direction). The axis of cylindrical lens 14 is oriented horizontally (in the Y direction), and is thus used for determining the directional characteristic in the elevation.

The distance between cylindrical lenses 12, 14 on the one hand and antenna elements 10 on the other hand may be the same, slightly greater, or slightly less than the focal distance of the lens in question.

In the example shown, the two cylindrical lenses 12, 14 are positioned back-to-back so that their vertices point in opposite directions. Cylindrical lens 14, whose vertex faces away from antenna elements 10, may be configured as an aplanatic lens, i.e., a lens which is essentially free of spherical aberration.

When the two lenses are provided separately, as in FIG. 1, they may be composed of different materials and therefore may also have different indices of refraction. In general, the two lenses have different focal distances. Thus, for example, the radar lobes may be bundled more strongly in the elevation using cylindrical lens 14 than they are bundled in the azimuth using cylindrical lens 12. The stronger bundling in the elevation allows avoidance of interfering signals caused by backscattering of scattering centers on the roadway surface when the radar lobe is too wide. On the other hand, the directional characteristic in the azimuth may be adjusted, using cylindrical lens 12, in such a way that the radar lobes of the four antenna elements 10 cover the entire relevant roadway width, so that in any event, in a distance range that is relevant for locating preceding vehicles, all vehicles in the host vehicle's lane and also in adjacent lanes may be consistently located, while on the other hand radar echoes of irrelevant objects to the left and right of the roadway are largely avoided.

Since individual antenna elements 10 are offset by different distances with respect to the optical axis of cylindrical lens 12, the antenna elements together with cylindrical lens 14 generate radar lobes which differ slightly from one another in their primary beam direction. The resulting differences in the signals received by the various antenna elements allow the azimuth angle of the objects to be determined. Because cylindrical lens 14 responsible for the bundling in the elevation has a constant profile in the Y direction, it has little influence on the shape of the radar lobes in the azimuth.

In the example shown in FIG. 1, the two cylindrical lenses 12, 14 are situated with their planar, mutually facing surfaces at a distance from one another. FIG. 2 shows a modified example in which this space between the two cylindrical lenses is filled by cuboidal packing 16 which does not appreciably influence the optical characteristics of the lens system.

FIG. 3 shows an example in which the two cylindrical lenses 12, 14 directly contact one another at their planar surfaces. In FIGS. 2 and 3, the two cylindrical lenses 12, 14 and optionally packing 16 may also be manufactured as one piece.

FIG. 4 shows an example of a directional characteristic in the azimuth (in the horizontal direction) for a radar sensor having the design shown in principle in FIGS. 1 through 3. In this case, amplitude A of the transmitted signal (or similarly the sensitivity for the received signal) is plotted with respect to azimuth angle $\alpha_Y$ in the range of $\pm 30°$. It is shown that the main lobe has a width of approximately $\pm 15°$, which allows good monitoring of the roadway and at the same time allows sufficient angular resolution capability.

Figure 5:
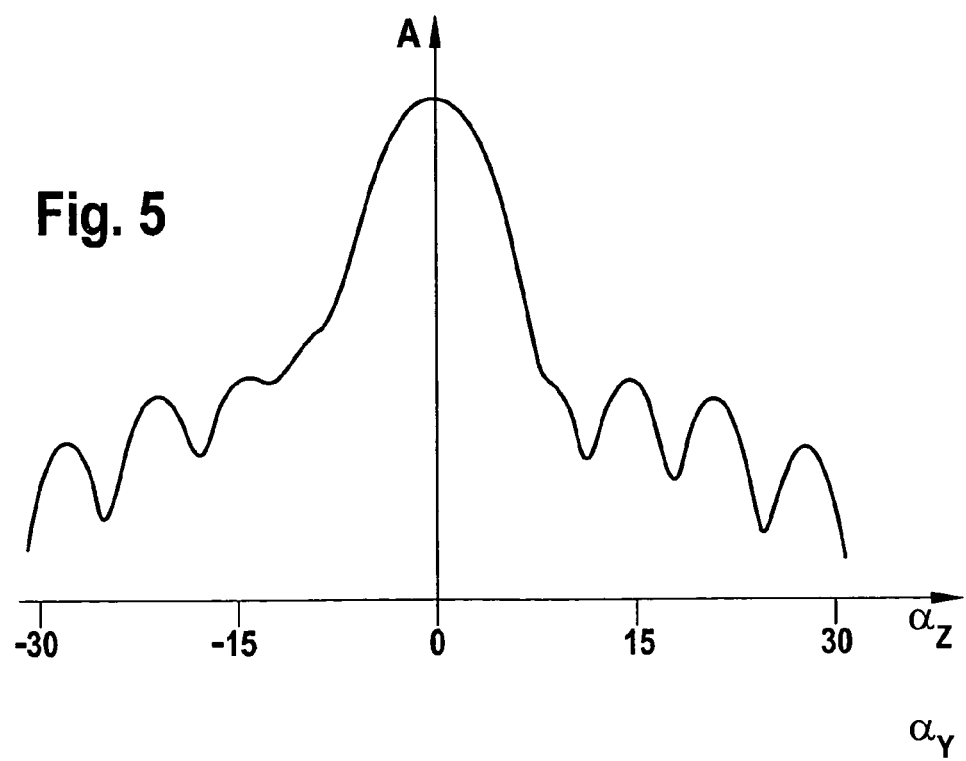

In comparison, FIG. 5 shows the directional characteristic of the same radar sensor in the elevation. In this case, amplitude A is plotted with respect to elevation angle $\alpha_Z$ in the range of $\pm 30°$. It is shown that the main lobe is symmetrical with respect to the elevation of $0°$, and has a much smaller width of approximately $\pm 10°$. Side lobes are well suppressed, and therefore the radar sensor is largely insensitive to interfering reflections from the roadway surface. If a phased array, for example, were used instead of a cylindrical lens for beam shaping in the elevation, a directional characteristic having the characteristics shown in FIG. 5 would not be achieved, or at best might be achieved with a very high level of complexity.

Figure 6:
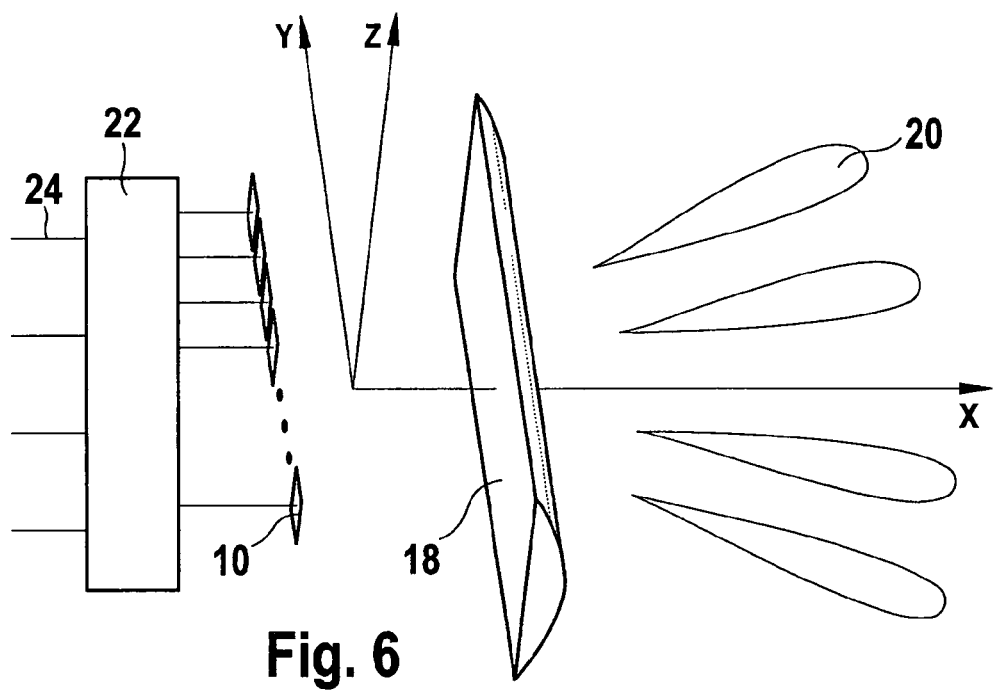
FIG. 6 shows a schematic diagram of a radar sensor according to a further exemplary embodiment of the present invention.

FIG. 6 shows a schematic diagram of a radar sensor according to a further exemplary embodiment in which only a single lens, namely, a cylindrical lens 18, is provided in front of the plane of antenna elements 10, and which is used to determine the directional characteristic in the elevation. In this case, the beam shaping in the azimuth is achieved by the fact that antenna elements 10 form multiple group antennas, each including a plurality of antenna elements whose phases are adjusted to one another in such a way that the antenna elements generate a radar lobe 20 having a specified main beam direction. In the example shown, antenna elements 10 of all groups are positioned in a single row and form a total of four groups, resulting in four radar lobes 20 which are angularly shifted with respect to one another in the azimuth. In this case, the bundling of these lobes in the azimuth is achieved by interference between the antenna elements which belong to the same group and those which are activated by signals having a fixed phase angle.

A monostatic antenna design is also implemented in this example; i.e., antenna elements 10 are used for transmitting as well as receiving. The individual groups may be activated by signals having the same frequency, or optionally by frequency-shifted signals. A supply and evaluation circuit 22 selects the signals received from the individual antenna elements 10 as a group and generates four output signals 24, each of which represents the echo received in one of radar lobes 20.

Thus, in this exemplary embodiment the bundling of the radar lobes in the azimuth is achieved by the configuration and phase angle of antenna elements 10, whereas the bundling in the elevation is achieved by the geometry of cylindrical lens 18. Here as well, the two beam-shaping devices for the elevation and the azimuth operate essentially independently of one another.

Figure 7:
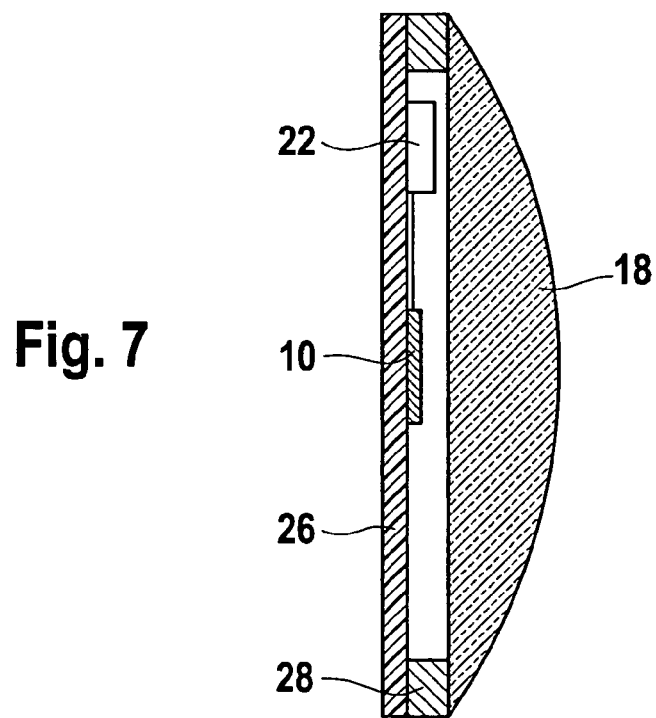
FIG. 7 shows a schematic section through the radar sensor according to FIG. 6.

FIG. 7 shows a schematic section of a radar sensor having the design shown in principle in FIG. 6. Antenna elements 10 and supply and evaluation circuit 22 are situated on a shared board 26, to which cylindrical lens 18 is fastened with the assistance of spacers 28 in such a way that the cylindrical lens is at a suitable distance from each of antenna elements 10. In this case, cylindrical lens 18 is simultaneously used as a cover for antenna elements 10 and for the remaining high-frequency components on plate 26, thus allowing a compact design of the radar sensor.

Figure 8:
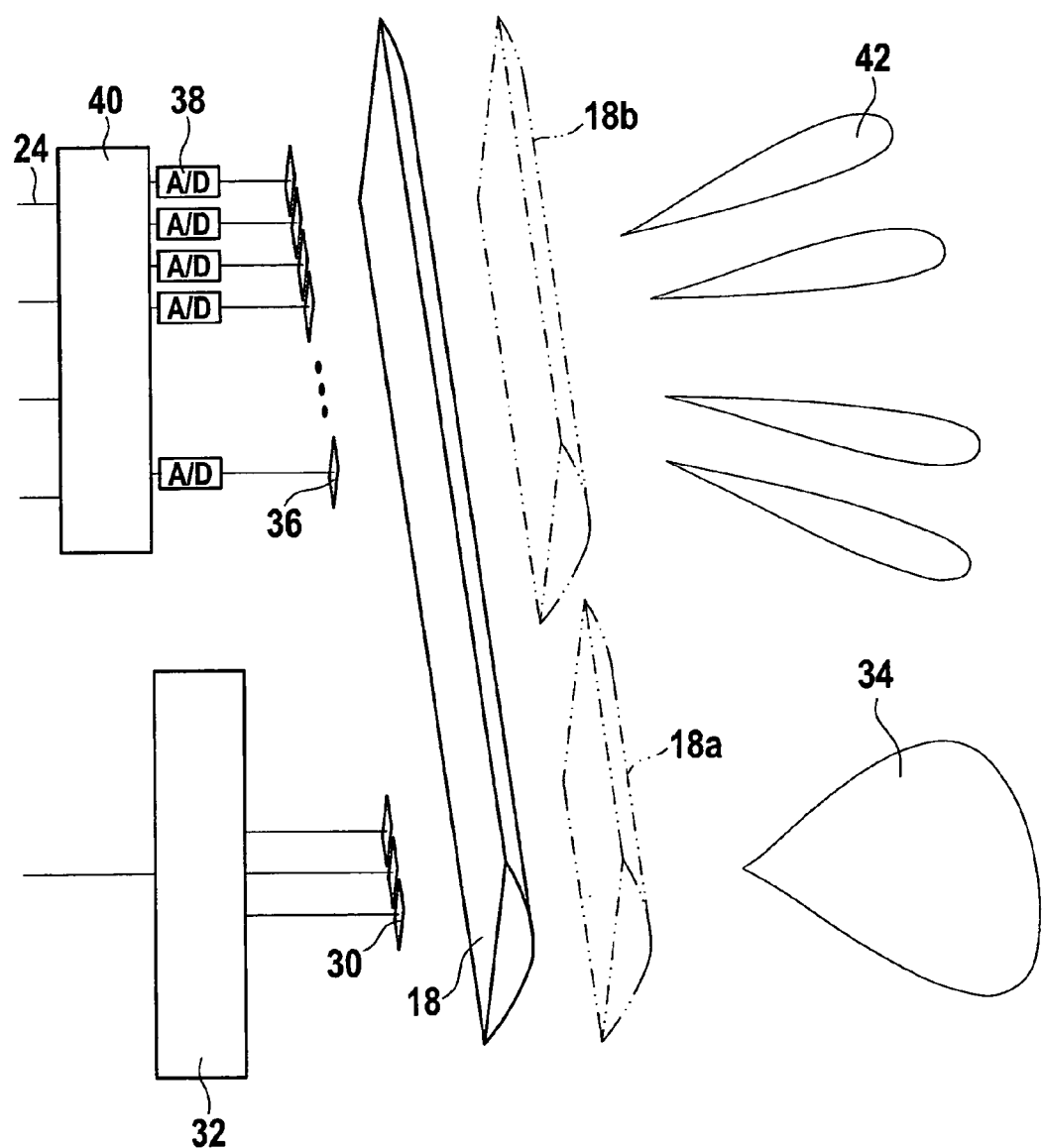
FIG. 8 shows a diagram illustrating possible variants of the radar sensor according to FIG. 6.

As an example, FIG. 8 illustrates a radar sensor in which a bistatic antenna design is implemented. A row of antenna elements 30 forms a group antenna which is used solely for transmitting the radar signal sent from a supply circuit 32 and which provides for bundling of the emitted radar radiation in the azimuth. The bundling in the elevation is achieved once again by cylindrical lens 18, ultimately resulting in a transmission lobe 34 which is bundled at different intensities in the azimuth and in the elevation.

An additional row of antenna elements 36, which may be collinear with the row of antenna elements 30, forms a plurality of group antennas which is used solely as receiving antennas. The signals received from each individual antenna element 36 are digitized in analog/digital converters 38 and are then supplied to a shared digital evaluation device 40, for example a microcontroller, which offsets the signals with respect to one another according to their phase angle in such a way that for each group antenna a reception lobe 42 results which has a slightly different main sensitivity direction. The bundling of individual reception lobes 42 in the azimuth is achieved by a phase-matched combination of the signals from multiple antenna elements 36 belonging to the same group. Here as well, this results in four output signals 24, one for each reception lobe 42, from which the distance, relative velocity, and azimuth angle of the located objects may then be computed.

In the example shown, a single, relatively elongated cylindrical lens 18 is provided which extends over all antenna elements 30 and 36. In one modified specific embodiment, however, separate cylindrical lenses 18a and 18b may be provided for transmitting antenna elements 30 on the one hand and receiving antenna elements 36 on the other hand, as indicated in FIG. 8 by dashed-dotted lines.

What is claimed is:

1. A radar sensor for a motor vehicle, comprising:
   a transmitting and receiving device for transmitting and receiving microwaves;
   a beam-shaping device which determines a directional characteristic of at least one of transmitted microwave radiation and received microwave radiation in an azimuth and in an elevation; and
   beam-shaping devices which are independent of one another for the azimuth and the elevation, the beam-shaping device for the elevation having a cylindrical lens;
   wherein the beam-shaping device for the azimuth has an additional cylindrical lens whose axis is oriented perpendicular to an axis of the cylindrical lens used for beam shaping in the elevation, and
   wherein the cylindrical lenses are planoconvex and their planar surfaces face one another.

2. The radar sensor of claim 1, wherein a cuboidal spacer is inserted between the planar surfaces of the cylindrical lenses.

3. The radar sensor of claim 1, wherein the cylindrical lenses directly contact one another at their planar surfaces.

4. The radar sensor of claim 1, wherein the two cylindrical lenses are configured as one piece.

5. The radar sensor of claim 1, wherein the beam-shaping device for the azimuth is formed by a device for simultaneously activating multiple antenna elements.

6. The radar sensor of claim 5, wherein the antenna elements are transmitting antennas and at the same time receiving antennas.

7. The radar sensor of claim 5, wherein some of the antenna elements are transmitting antennas and some of the antenna elements are receiving antennas.

8. The radar sensor of claim 7, wherein the antenna elements that are used as transmitting and receiving antennas are situated behind a shared cylindrical lens.

9. The radar sensor of claim 5, wherein the cylindrical lens forms a cover on a board which supports the transmitting and receiving device.

10. The radar sensor of claim 1, wherein at least one cylindrical lens is an aplanatic lens.

* * * * *